US006669851B2

(12) United States Patent
Clark et al.

(10) Patent No.: US 6,669,851 B2
(45) Date of Patent: Dec. 30, 2003

(54) WATER PURIFICATION BY POLYMER COLLOIDS

(75) Inventors: Mark M. Clark, Urbana, IL (US); Robert Riley, La Jolla, CA (US)

(73) Assignee: Board of Trustees of University of Illinois, Urbana, IL (US)

( * ) Notice: Subject to any disclaimer, the term of this patent is extended or adjusted under 35 U.S.C. 154(b) by 0 days.

(21) Appl. No.: 09/995,252

(22) Filed: Nov. 26, 2001

(65) Prior Publication Data

US 2003/0100617 A1 May 29, 2003

(51) Int. Cl.[7] .............................. B01J 2/26; B01J 20/34; C02F 1/28; C08G 75/20; C08G 75/23
(52) U.S. Cl. ....................... 210/670; 210/650; 210/661; 210/692; 252/180; 502/402; 516/77; 525/906; 528/391
(58) Field of Search ........................... 516/77; 252/180; 525/906; 528/391; 502/402; 210/661, 670, 692

(56) References Cited

U.S. PATENT DOCUMENTS

| | | | | |
|---|---|---|---|---|
| 2,684,950 A | * | 7/1954 | Rivers et al. | |
| 3,272,782 A | * | 9/1966 | Lang | 516/77 X |
| 3,272,784 A | * | 9/1966 | Lang | 252/180 X |
| 4,247,432 A | | 1/1981 | Huang et al. | |
| 4,321,174 A | * | 3/1982 | Hoy et al. | 525/906 X |
| 4,451,424 A | * | 5/1984 | Tweddle et al. | 525/906 X |
| 4,569,989 A | * | 2/1986 | Madison | 252/180 X |
| 4,661,257 A | | 4/1987 | Kreevoy et al. | 210/638 |
| 4,990,248 A | | 2/1991 | Brown et al. | 210/136 |
| 5,041,335 A | * | 8/1991 | Inai et al. | 252/906 X |
| 5,418,203 A | * | 5/1995 | Ichikawa et al. | 502/402 |
| 5,434,226 A | * | 7/1995 | Nguyen et al. | 525/906 X |
| 5,904,832 A | * | 5/1999 | Clifford et al. | 210/670 X |
| 5,969,082 A | * | 10/1999 | Kuwahara et al. | 525/906 X |
| 6,110,375 A | | 8/2000 | Bacchus et al. | 210/652 |
| 6,451,921 B2 | * | 9/2002 | Weisse et al. | 528/391 X |

OTHER PUBLICATIONS

Fritzsche, A.K., et al., The Effect of Free Volume on Enhanced Transport Rates of Polysulfone Hollow Fiber Membranes Spun from Lewis Acid: Base Solvent Complexes, *Journal of Membrane Science*, 46 (1989) 135–155.

Von Wandruszka, R., Final Report: The Secondary of Humic Acid and it Environmental Implications, at http://es.epa.gov/ncerqa/final/vonwandruszka.html Nov. 18, 1999.

Humic Acid, at http://www.greensmiths.com/humic.htm 1996.

Frost & Sullivan, "Activated Carbon: Sinking Market or Secure Opportunity?" at http://www.waternet.com/new.asp 2001.

Murakami, H., et al., "Preparation of poly(DL–lactide–c-o–glycolide) nanoparticles by modified spontaneous emulsification solvent diffusion method," International Journal of Pharmaceutics, vol. 187, pp. 143–152 (1999).

Berkland, C., et al., "Fabrication of PLG microspheres with precisely controlled and monodisperse size distributions," Journal of Controlled Release, vol. 73, pp. 59–74 (2001).

Fritzsche, A.K., et al., "The Effect of Free Volume on Enhanced Transport Rates of Polysulfone Hollow Fiber Membranes Spun from Lewis Acid: Base Solvent Complexes", *Journal of Membrane Science*, 46 (1989) 135–155.

Kociuk, et al., "Water Purification and Desalination, An AP Chemistry Project", printed from the Internet at: http://shell.rmi.net/~chill/chemistry/h2o/h20.html, dated Jan. 2, 2001, pp. 1–5.

Von Wandruszka, R., "Final Report: The Secondary of Humic Acid and it Environmental Implications", printed from the *U.S. Environmental Protection Agency* Internet website at: http://es.epa.gov/ncerqa/final/vonwandruszka.html dated Jan. 2, 2002, pp. 1–5.

"Humic Acid", printed from the Internet at http://www.greensmiths.com/humic.htm, dated Jan. 2, 2001, pp 1–3.

Frost & Sullivan, "Activated Carbon: Sinking Market or Secure Opportunity?" printed from the Internet at http://www.waternet.com/new.asp, dated Aug. 9, 2001, pp 1–2.

Solvay Advanced Polymers, "Radel®, Udel® Mindel® sulfone polymers pack a powerful punch", printed from the Internet at: http://www.solvayadvancedpolymers–us.com/ep_performance_amorphous.htm, dated Feb. 4, 2002, pp. 1–2.

Solvay Advanced Polymers, Udel® P–1700, printed from the Internet at: http://www.solvayadvancedpolymers–us.com/ep_datasheet.asp, on Feb. 4, 2002. pp. 1–2.

Solvay Advanced Polymers, Udel® GF–120, printed from the Internet at: http://www.solvayadvancedpolymers–us.com/ep_datasheet.asp, on Feb. 4, 2002, pp. 1–2.

Solvay Advanced Polymers, Radel® A–200, printed from the Internet at: http://solvayadvancedpolymers–us.com/ep_datasheet.asp, on Feb. 4, 2002, pp 1–2.

Solvay Advanced Polymers, Radel® A–300, printed from the Internet at: http://www.solvayadvancedpolymers–us.com/ep_datasheet.asp, on Feb. 4, 2002, pp. 1–2.

(List continued on next page.)

Primary Examiner—Richard D. Lovering
(74) Attorney, Agent, or Firm—Brinks Hofer Gilson & Lione

(57) ABSTRACT

A colloid comprises a sulfone polymer. The colloid may be used as a replacement for activated carbon or charcoal in water purification systems. Unlike activated carbon, the colloid is advantageously regenerated chemically and reused.

28 Claims, 4 Drawing Sheets

OTHER PUBLICATIONS

Solvay Advanced Polymers, Radel® AG–320, printed from the Internet at: http://www.solvayadvancedpolymers–us.com/ep_datasheet.asp, on Feb. 4, 2002, pp 1–2.

Solvay Advanced Polymers, Radel® AG–330, printed from the Internet at: http://www.solvayadvancedpolymers–us.com/ep_datasheet.asp, on Feb. 4, 2002, pp 1–2.

Solvay Advanced Polymers, Radel® R–5000, printed from the Internet at: http://www.solvayadvancedpolymers–us.com/ep_datasheet.asp, on Feb. 4, 2002, pp 1–2.

Solvay Advanced Polymers, Radel® R–5100 NT 15, printed from the Internet at: http://www.solvayadvancedpolymers–us.com/ep_datasheet.asp, on Feb. 4, 2002, pp 1–2.

Solvay Advanced Polymers, Radel® R–5500, printed from the Internet at: http://www.solvayadvancedpolymers–us.com/ep_datasheet.asp, on Feb. 4, 2002, pp 1–2.

Solvay Advanced Polymers, Radel® R–5800, printed from the Internet at http://www.solvayadvancedpolymers–us.com/ep_datasheet.asp, on Feb. 4, 2002, pp 1–2.

Solvay Advanced Polymers, Radel® R–7700, printed from the Internet at: http://www.solvayadvancedpolymers–us.com/ep_datasheet.asp, on Feb. 4, 2002, pp 1–2.

Solvay Advanced Polymers, Mindel® B–430, printed from the Internet at: http://www.solvayadvancedpolymers–us.com/ep_datasheet.asp, on 2/4/2, pp. 1–2.

Solvay Advanced Polymers, Mindel® S–1000, printed from the Internet at: http:www.solvayadvancedpolymers–us.com/ep_datasheet.asp, on Feb. 4, 2002, pp. 1–3.

Product Information Sheet for X–100: TRITON X–100™, printed from the Internet at: http://www.sigma.sial.com/sigma/proddata/t6878.htm, on Feb. 4, 2002, pp. 1–3.

Product Information Sheet for TRITON Detergents: Octylphenol Series, prited from the Internet at: http://www.sigma.sial.com/sigma/proddata/t6878x.htm, on Feb. 4, 2002, 1 page.

* cited by examiner

Laboratory Apparatus For Synthesizing The Sulfone Polymer Colloids

WATER PURIFICATION BY POLYMER COLLOIDS

BACKGROUND

The present invention relates to a novel process for the purification of water. Dissolved organic substances typically found in water supplies include man-made compounds and the natural products of plant decay, including humic acid, which can give undesirable color, taste, and odor to water. Dissolved organics also interfere with the water purification process by clogging filters and fouling resin beds. Furthermore, during treatment of the water supply at drinking water treatment facilities, natural organic matter can also react with chemical disinfectants, such as chlorine, to produce chlorinated-organic compounds, many of which are known carcinogens.

Activated carbon has long been used to adsorb organic compounds from water supplies. Typically, carbon filters are used prior to other purification processes to partially purify the water and prevent fouling of ion-exchange beds or membranes. Presently, activated carbon pre-filters are used before high performance water purification membranes, such as reverse osmosis membranes. Without a pre-filter, such membranes would rapidly clog with organic contaminants. However, all activated carbons have the disadvantage of requiring disposal or regeneration after their adsorption capacity is exhausted.

Many activated carbons, including those in powdered form, are never regenerated and remain in the residuals or sludges generated from water treatment. These residuals or sludges must then be disposed of as solid waste, usually in a landfill, which poses a secondary pollution problem.

Unlike their powdered counterparts, granular activated carbons can be regenerated using a high temperature process where the adsorbed organic materials are volatized or burned from the carbon. This process is energy intensive, and can cause secondary air and water pollution problems.

BRIEF SUMMARY

In a first aspect, the present invention is a colloid comprising a sulfone polymer.

In a second aspect, the present invention is a method for purifying water, comprising contacting a colloid comprising a polymer with water, the water comprising organic matter; and separating the colloid from the water.

In a third aspect, the present invention is a method of purifying a colloid comprising contacting a colloid further comprising organic matter with an alkali solution.

DETAILED DESCRIPTION

The present invention includes using colloids, such as sulfone polymer colloids, to adsorb organic contaminants from water. The colloids may be made, for example, by dissolving a sulfone polymer in a solvent and precipitating the sulfone polymer as a polymer colloid. When the colloids are added to water containing organic contaminants, the contaminants are adsorbed onto the colloids. Removal of the colloids from the water results in removal of the organic contaminants, purifying the water. The colloids may be regenerated, or cleaned of the adsorbed organic contaminants, by exposing them to base. The regenerated colloids may then be reused.

The colloids may directly replace powdered activated carbon as it is presently used in drinking water treatment, for taste and odor control and adsorption of natural and synthetic organic pollutants. Rather than being discarded in the water treatment sludge, as is presently done with activated carbon, the colloids may be regenerated and reused. Additionally, the colloids can be used in place of an activated carbon pre-filter. When the colloids are made from the same or similar polymer as the purification membrane, superior pre-filtration is possible.

As described in Van Nostrand's Encyclopedia of Chemistry, pp. 272–276 (Douglas M. Considine ed., Van Nostrand Reinhold Co. 1984), colloids are disperse systems with at least one particle dimension averaging in the range of $10^{-6}$ to $10^{-3}$ mm. Particles may be defined as liquid or solid. Examples include sols (dispersions of solid in liquid), emulsions (dispersions of liquids in liquids), and gels (systems, such as jelly, in which one component provides a sufficient structural framework for rigidity and other components fill the space between the structural units). Preferably, the polymer colloids of the current invention are sols or sol-gels.

The polymer colloids may be precipitated when a solution containing the polymer is added to a liquid in which the polymer has lower solubility than the solvent of the solution. The solution is formed by dissolving the polymer in a solvent or mixture of solvents that has a higher solubility toward the polymer.

Figure 1:
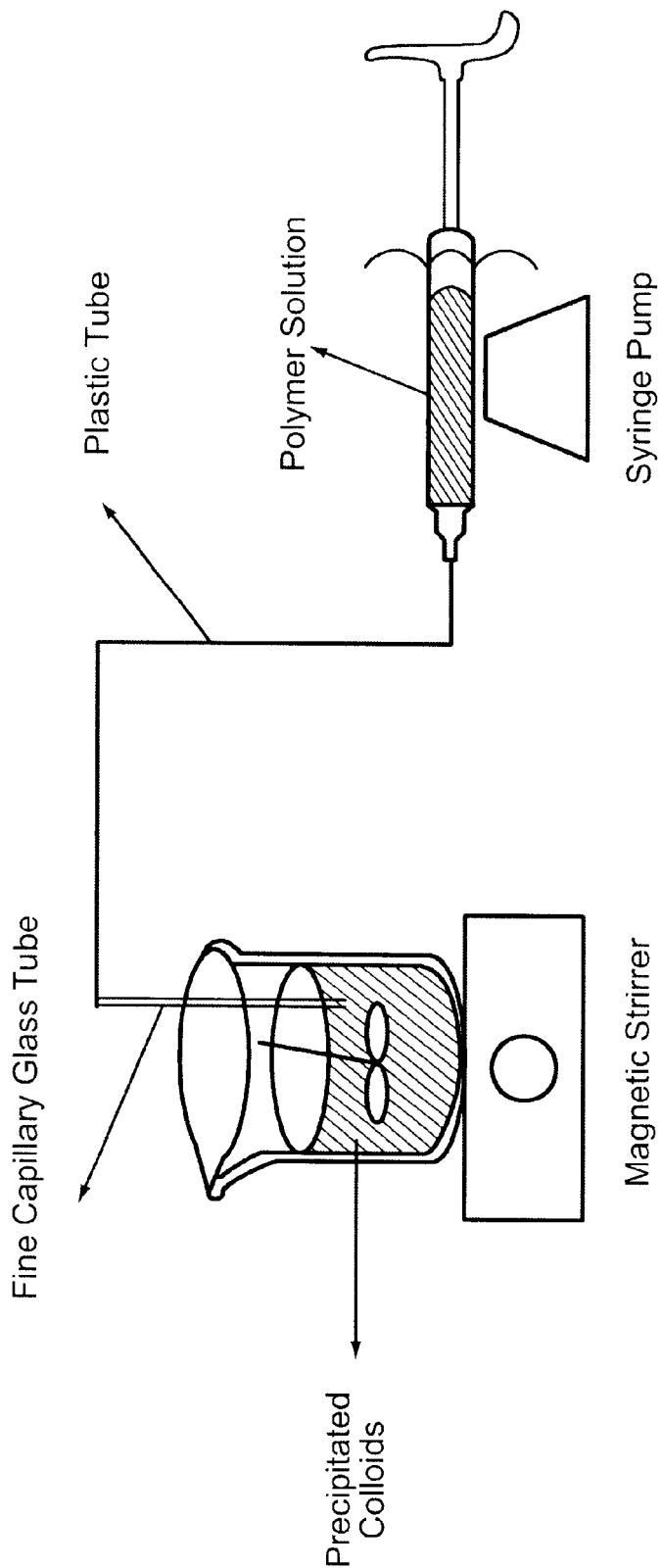
FIG. 1 shows a representative laboratory scale synthesis apparatus for forming polymer colloids.

When the solution containing the polymer is added to a liquid having a lower solubility for the polymer, polymer colloids precipitate. Various solvents, solvent mixtures, surfactants, wetting agents, and acids can be used to tailor the morphology of the colloids. While many large scale production methods could be used, as known to those of skill in the art, a syringe pump is appropriate on the laboratory scale. A representative laboratory scale synthesis apparatus is shown in FIG. 1.

Polymers useful in the present invention include, sulfone homopolymers and copolymers such as polymers of polysulfone, polyethersulfone, polyphenylsulfone, and sulfonated polysulfone; homopolymers and copolymers of cellulose acetate, polyacrylonitrile (PAN), polyetherimide, and poly(vinylidene fluoride) (PVDF); and mixtures thereof. Such polymers may be purchased from AMOCO PERFORMANCE PRODUCTS, INC. (Alpharetta, Ga.) under the trade names of UDEL (polysulfone), MINDEL (sulfonated polysulfone), RADEL-A (polyethersulfone), and RADEL-R (polyphenylsulfone). They are also available from ALDRICH, Milwaukee, Wis.

Suitable average molecular weights for polysulfone useful in the current invention range preferably from 10,000 to 45,000, more preferably from 17,000 to 35,000, and most preferably from 26,000 to 27,000. Suitable average molecular weights for polyethersulfone useful in the current invention range from 8,000 to 28,000, preferably from 13,000 to 23,000, and most preferably from 16,000 to 20,000. Suitable average molecular weights for poly(vinylidene fluoride) useful in the current invention range preferably from 100,000 to 600,000, more preferably from 180,000 to 534,000, and most preferably from 275,000 to 530,000. Suitable average molecular weights for polyacrylonitrile useful in the current invention range preferably from 30,000 to 150,000, more preferably from 60,000 to 110,000, and most preferably from 80,000 to 90,000. All average molecular weights are weight average molecular weights.

The solution containing the polymer includes the polymer and one or more solvents in which the polymer demonstrates solubility. Any solvent that permits colloid formation when the polymer solution is added to a liquid in which the polymers have lower solubility may be used. Additionally, the solution may contain an acid. Any acid which is compatible with the selected polymer and solvent system can be used if colloids form when the solution is mixed with a liquid in which the polymer has lower solubility. Although not intending to be bound by any particular theory, it is believed that the acid (a weak Lewis acid) complexes with the solvent (a weak Lewis base) to form a complex which breaks up when mixed with the liquid. Many acid/solvent systems are possible and are more fully described, for example, in Fritzsche, et. al., *Journal of Membrane Science*, 46, 135 (1989).

Suitable solvents include N-methyl pyrrolidine (NMP), N,N-dimethylformamide (DMF), dimethyl sulfoxide (DMSO), acetone, and dioxane, and are available from ALDRICH, Milwaukee, Wis. Suitable acids include organic acids, such as propionic acid.

Additionally, surfactants may be added to the solution to stabilize the colloids and otherwise vary their morphology. While any surfactant, including anionic, cationic, or non-ionic, may be used, preferable surfactants include sodium lauryl sulfate, TRITON X-45, and TRITON X-100, or mixtures thereof. Wetting agents, such as alcohols, may also be added.

Scanning electron micrographs show that small, relatively uniform spherical particles of colloids with average individual diameters of preferably from 10 to 1000 nanometers (nm), more preferably from 25 to 500 nm, and most preferably from 50 to 100 nm, are formed during precipitation. Aggregates of the colloid particles attain various shapes and sizes with a wide size distribution. Average aggregate diameters are from 10 $\mu$m to 1000 $\mu$m, preferably from 25 $\mu$m to 500 $\mu$m, and most preferably from 100 $\mu$m to 500

When the polymer colloids are added to water containing organic matter, the contaminating organic matter is adsorbed. The addition may be carried out in any appropriate agitated vessel or fluidized reactor. Although variables, including temperature, contaminant concentration, and colloid concentration affect the rate of adsorption, the organic matter is typically adsorbed onto the colloids within minutes to hours.

Organic matter includes hydrocarbons, hydrophobic pollutants, or pollutants with mixed hydrophobic/hydrophilic properties that pollute water by imparting an undesirable color, taste, or odor, as well as any other carbon-containing compound. Preferably, the present invention removes natural organic matter; natural organic matter includes carbon containing material typically found in drinking water supplies. Although many types of organic matter contaminants may be found in water, humic acid is one of the most common. Other organic matter contaminants include benzene, toluene, proteins, geosmin (a natural organic compound leached from soils), and 2-methylisoborneol (MIB) (a natural organic compound of aquatic biological origin).

Figure 2:
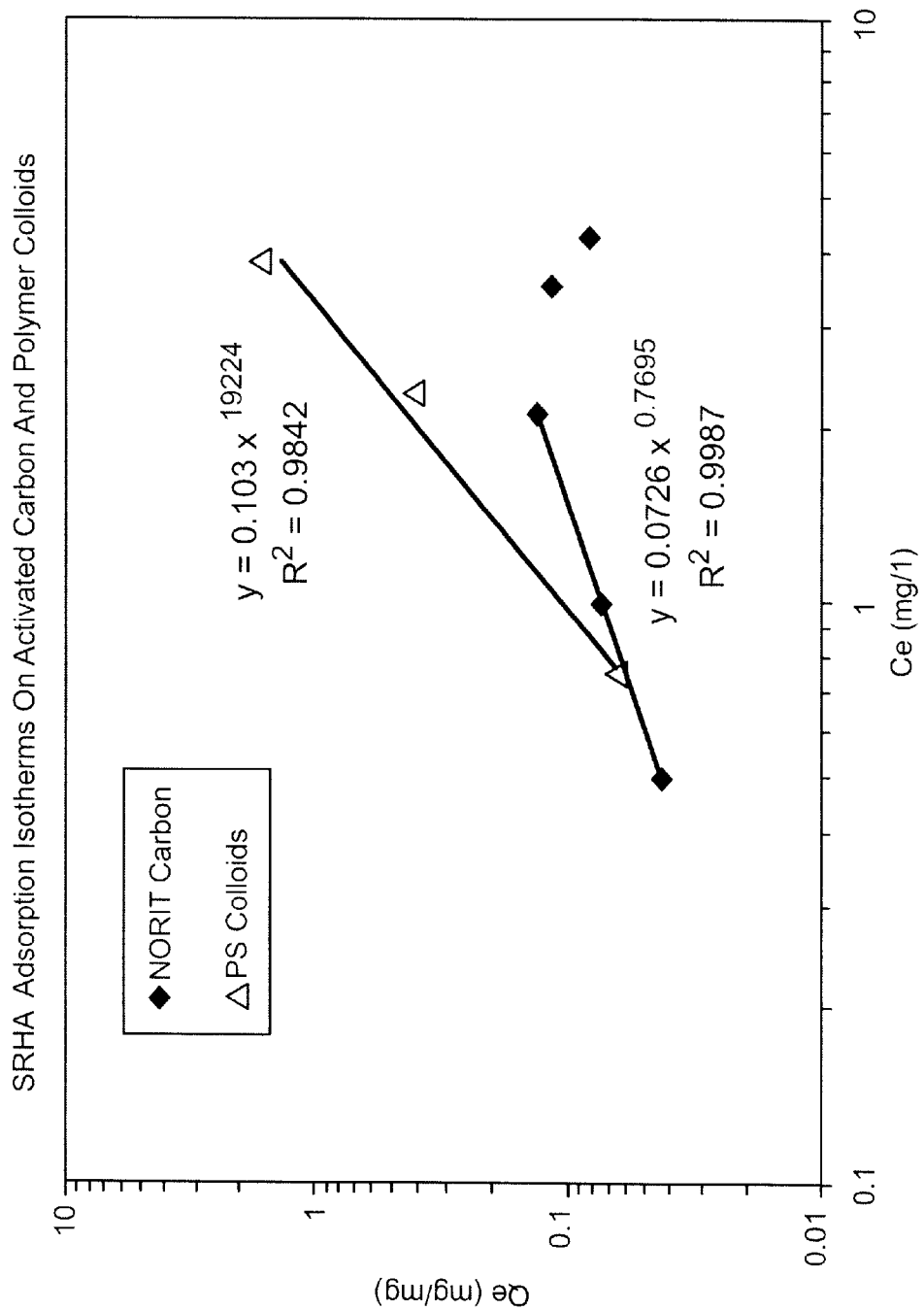
FIG. 2 shows the adsorption isotherm for humic acid on sulfone polymer colloids and NORIT powdered activated carbon.

Purified water is formed by removing the colloids that contain the organic contaminants from the water. As shown in FIG. 2, the colloidal polymers have a larger adsorption capacity for humic acid than activated carbon adsorbents typically used in the treatment of drinking water, including NORIT powdered activated carbon.

Any method may be used to remove the contaminated colloids from the water, such as centrifugation, filtration, gravity decantation, counter-current decantation, and packed column filtration. Filtration methods typically entail passing the purified water containing the contaminated colloids through a filter with pore sizes of a smaller average diameter than the average diameter of the colloids.

Gravity and counter-current decantation and fluidized bed methods rely on the colloids, or the substrates to which they are bound, having a greater density than the purified water. Gravity decantation describes methods where the colloids are allowed to settle due to gravity from the purified water, which is then removed without significantly disturbing the settled colloids. Counter-current decantation and fluidized beds suspend the colloids in the contaminated water stream using fluid movement.

Similarly, the colloids may be immobilized on a substrate which is then filtered out. Alternatively, the colloids are immobilized on a membrane or a packed column of substrate beads through which the contaminated water passes. Typically, a suspension containing the colloids are vacuum filtered through a membrane, thus trapping the colloids or their aggregates on the membrane. Suitable substrates include any material which is chemically compatible with the colloids and has the ability to bind the colloids while being physically larger, such as glass or plastic beads or mesh. The colloids may also be held in a container, such as a nylon mesh bag, which is permeable to water but not the colloids.

Figure 3:
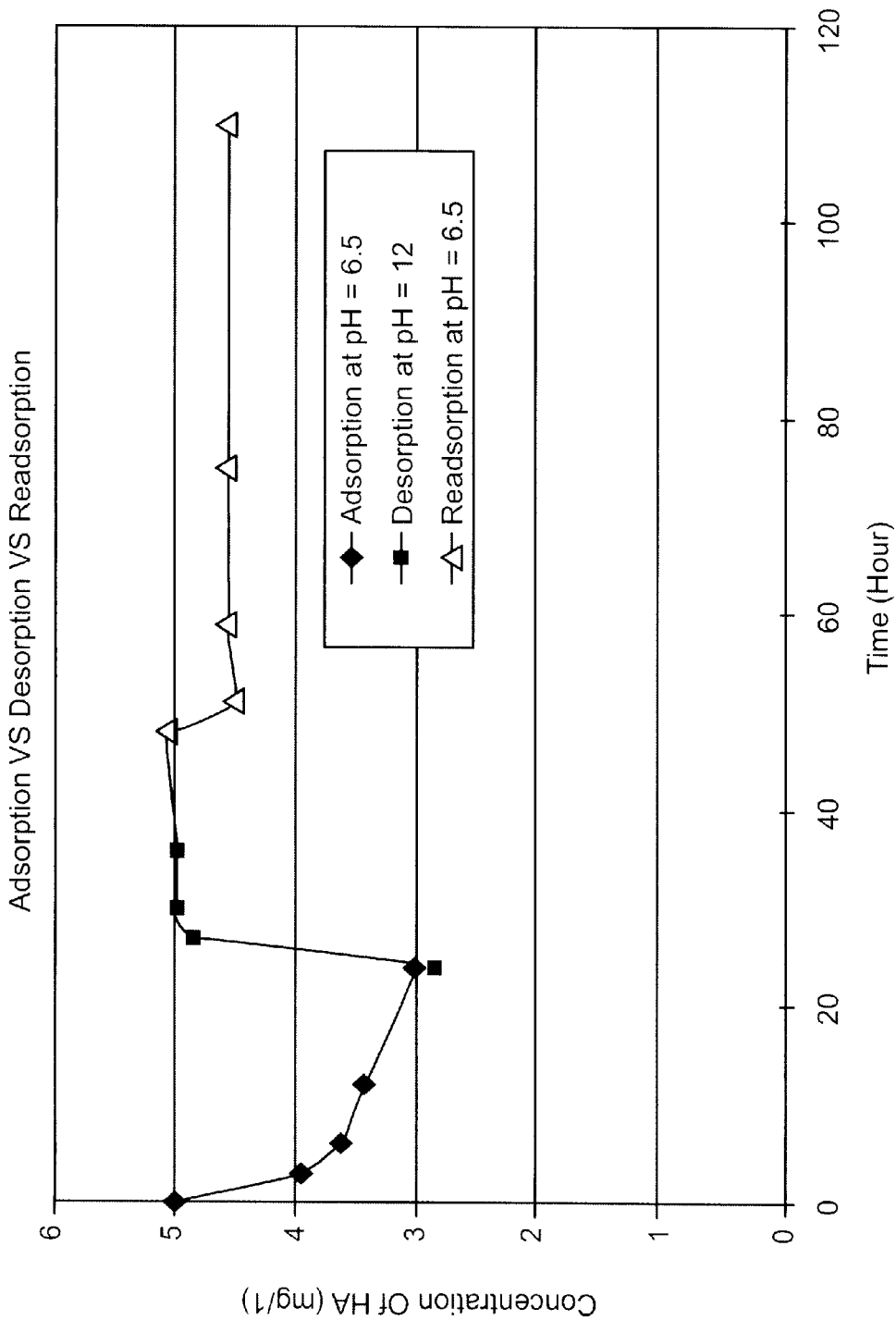
FIG. 3 shows the regeneration of sulfone polymer colloids at increased pH and the readsorption of humic acid onto the colloids.

Once the contaminated colloids are removed from the purified water, they may be regenerated by chemically desorbing the organic contaminants. Unlike activated carbon, this allows reuse of the colloids for continued water purification and optional recovery of the organic contaminants (FIG. 3). In many instances, the organic contaminants have value as a fertilizer for plants.

The organic contaminants are desorbed from the colloids by exposing the colloids to an alkali solution. Although the alkali solution may be of any concentration, it preferably has a free hydroxide concentration of $1 \times 10^{-4}$ to 10 N, more preferably of $1 \times 10^{-3}$ to 5 N, and most preferably of $1 \times 10^{-2}$ to 1 N. Any alkali solution may be used, such as a solution of sodium hydroxide, ammonium hydroxide, potassium hydroxide, calcium hydroxide, or mixtures thereof. Sodium hydroxide is most preferred.

Once the colloids are exposed to elevated pH, they are removed from solution using separation methods apparent to those of skill in the art, including those previously described, and are returned to the water source to remove more organic contaminants.

EXAMPLES

Example 1

Two grams of polysulfone (PS) (26,000–27,000 MW) was added to 56 grams of N-methyl pyrrolidine (NMP) solvent. The mixture was shaken in a gyrator until the polysulfone solids fully dissolved (approximately 1 day). Forty two grams of propionic acid (PA) was added to the PS/NMP solution to form a mixture with a molar ratio of 1:1 PS/NMP to PA. The mixture was shaken until a homogeneous solution formed. The solution was stored at room temperature.

A syringe was then filled with 2.5-mL of the stored solution and placed in a syringe pump with a pumping rate of 1.5 mL/hr. A beaker was filled with 500 mL of deionized water which was stirred by a magnetic stirrer. The syringe pump was then used to pump the polysulfone containing solution through a capillary tube into the stirred water at about 25° C. Polymer colloids formed in the deionized water. When agitation was stopped, the colloids quickly settled to form aggregates.

Colloid samples were observed under ordinary optical microscopy (aus JENA Laboval 4) with 200X magnification. Samples were also examined under Environmental Scanning Electron Microscopy (ESEM). The polysulfone colloids were concentrated onto 0.22-$\mu$m nylon filter paper by filtering the colloids solution with a syringe filter. The filter paper was then dried and coated with a gold-palladium sputter for ESEM analysis. ESEM analysis showed that the colloids are spherical in nature, having a diameter of about 50 nanometers, and are clumped into small aggregates.

Example 2

To test the performance of the PS colloids for water purification, Suwannee River Humic acid, obtained from the International Humic Substances Society, University of Minnesota, St. Paul, Minn. was used as a model. Humic acid was adsorbed by polysulfone colloids of varying concentration (100 mg/L, 10 mg/L, and 1 mg/L), but with constant humic acid concentration as follows:

A 15 mg/L humic acid solution was prepared by dissolving 15 mg of humic acid (Suwannee River Humic acid, International Humic Substances Society) in a 1-Liter Erlenmeyer flask, with $10^{-3}$ M $Na_2HPO_4$ buffer. The solution pH was adjusted to 6.5 with 1 N HCl.

A 200 mL aliquot of each colloid composition (100 mg/L, 10 mg/L, and 1 mg/L) was mixed with 100 mL of the 15 mg/L humic acid solution in a glass jar. The jar was covered with a sheet of aluminum foil, and the cap was screwed on tightly over the foil. The glass jars were then put onto a gyrator shaker at approximately 22° C. A 10 mL sample was drawn from each jar on the $1^{st}$, $3^{rd}$, $5^{th}$, and $7^{th}$ days and passed through a 0.22 $\mu$m nylon filter to remove the colloids. The percent of humic acid (HA) remaining in solution was then calculated from UV adsorption data at 254 nanometers. Recorded UV readings were the average of 10 replicates for each colloid concentration and are presented below in Table I.

TABLE I

| Time (days) | | 0 | 1 | 3 | 5 | 7 |
|---|---|---|---|---|---|---|
| Control 5 mg/L HA | UV-ads | 0.153 | 0.151 | 0.150 | 0.149 | 0.150 |
| 100 mg/L Colloid | UV-ads | 0.153 | 0.029 | 0.02 | 0.0194 | 0.02 |
| 15 mg/L HA | % HA Adsorbed | 0 | 80.79 | 86.67 | 86.98 | 86.67 |
| 100 mg/L Colloid | UV-ads | 0.153 | 0.036 | 0.025 | 0.023 | 0.025 |
| 15 mg/L HA | % HA Adsorbed | 0 | 76.16 | 83.33 | 84.56 | 83.33 |
| 10 mg/L Colloid | UV-ads | 0.153 | 0.088 | 0.081 | 0.076 | 0.069 |

TABLE I-continued

| Time (days) | | 0 | 1 | 3 | 5 | 7 |
|---|---|---|---|---|---|---|
| 15 mg/L HA | % HA Adsorbed | 0 | 41.72 | 46.00 | 48.99 | 54.00 |
| 1 mg/L Colloid | UV-ads | 0.153 | 0.139 | 0.131 | 0.124 | 0.117 |
| 15 mg/L HA | % HA Adsorbed | 0 | 7.95 | 12.67 | 16.78 | 22.00 |

Figure 4:
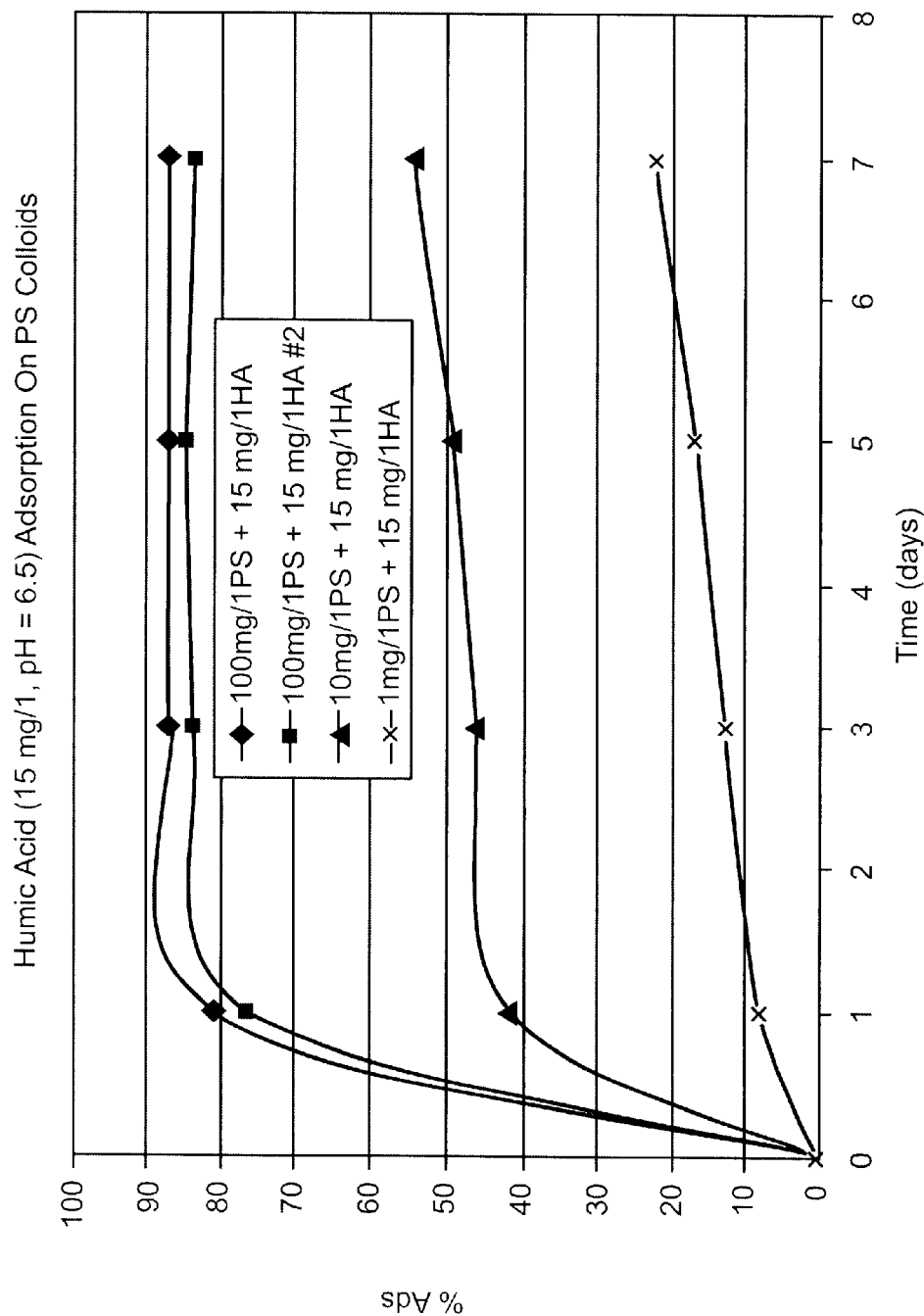
FIG. 4 shows the adsorption kinetics for humic acid at different sulfone polymer colloid concentrations.

The adsorption kinetics for humic acid at different polysulfone colloid concentrations are shown in FIG. 4. Almost 87% of the humic acid was adsorbed onto the 100 mg/L polysulfone colloids. Two trials of five aliquots each showed good reproducibility. The control samples demonstrated that the adsorption of humic acid on the wall of the glass jar was negligible, and that only polysulfone colloids contribute to the adsorption of humic acid over the 7 day period. Most adsorption occurred during day one and then plateaued. Based on the final sample taken on the $7^{th}$ day, an isotherm was determined as shown in FIG. 2. Using the Freundlich isotherm to fit the data, a F=0.103 (mg HA/mg polysulfone) and a 1/n=1.9224 were obtained.

Example 3

In order to check whether the polysulfone colloids are reusable, a set of adsorption, desorption and readsorption tests were performed with 300 mL aliquots of 10 mg/L polysulfone colloids added to 150 mL of 15 mg/L humic acid solution. Humic acid adsorption was performed in accord with the method described in Example 2. The humic acid was then desorbed from the colloids by raising the pH of the solution to 12 with 1 N sodium hydroxide.

Readsorption of humic acid was performed by adjusting the pH of the solution down to 6.5 with 1 N HCl. Since most humic acid adsorption occurred on the first day, the experiments were performed with 1 day adsorption, 1 day desorption, and 1 day readsorption time periods.

Example 4

The adsorption capacity of polysulfone colloids was compared to activated carbon as follows: A set of adsorption isotherms were performed with humic acid solution on activated carbon with carbon doses of 0, 5, 10, 20, 50, and 100 mg of activated carbon per Liter of humic acid solution.

NORIT SA-UF activated carbon, obtained from NORIT Americas, Atlanta, Ga., was used because it has the best adsorption capacity among the commercialized activated carbons. The initial concentration of humic acid was 5 mg/L and the solution pH was adjusted to 6.5. The experiment lasted 7 days and was considered to be in equilibrium on the $7^{th}$ day.

Adsorption isotherms of humic acid on activated carbon versus polysulfone colloids are shown in FIG. 2. For activated carbon adsorption, the linear fit of the first three data excluding the curvature gives a F=0.072, and 1/n=0.7695 with Freundlich isotherm fitting. Compared to the activated carbon, the polymer colloids demonstrated greater adsorption capacity, approaching an order of magnitude, as shown by the upper line.

Prophetic Example 5

Colloids are incorporated into a membrane by vacuum filtering a water suspension containing the colloids through a 0.22 micron pore diameter nylon filter. Even though the pore diameter of the filter is larger than the approximate 50 nm diameter of the colloid particles, the particles are trapped due to aggregation. Water contaminated with organic matter is then purified of organic matter by passing the contaminated water through the filter.

What is claimed:

1. A colloid comprising a sulfone polymer, wherein
the sulfone polymer is selected from the group consisting of copolymers and homopolymers of polysulfone, polyphenylsulfone, sulfonated polysulfone, and copolymers of polyethersulfone, or mixtures thereof; and where
particles of the colloid have an average diameter of 10 nm to 1000 nm.

2. The colloid of claim 1, wherein said polymer has a molecular weight of 13,000 to 23,000.

3. The colloid of claim 1, wherein said polymer has a molecular weight of 16,000 to 20,000.

4. The colloid of claim 1, wherein particles of said colloid have if an average diameter of 25 nm to 500 nm.

5. The colloid of claim 1, wherein said polymer is a homopolymer or a copolymer of polysulfone.

6. The colloid of claim 5, wherein said polymer has a molecular weight of 17,000 to 35,000.

7. The colloid of claim 5, wherein said polymer has a molecular weight of 26,000 to 27,000.

8. A method of purifying the colloid of claim 1, comprising:
contacting the colloid of claim 1 with organic matter to yield a colloid comprising organic matter; and
contacting the colloid comprising organic matter with an alkali solution.

9. The method of claim 8, wherein the organic matter comprises at least one member selected from the group consisting of humic acid, geosmin, and 2-methyl isoborneol.

10. The method of claim 8, wherein said alkali is selected from the group consisting of sodium hydroxide, potassium hydroxide, ammonium hydroxide, and calcium hydroxide, or mixtures thereof.

11. A colloid comprising a sulfone polymer, wherein particles of said colloid have an average diameter of 50 nm to 100 nm.

12. A method of purifying the colloid of claim 10, comprising:
contacting the colloid of claim 10 with organic matter to yield a colloid comprising organic matter; and
contacting the colloid comprising organic matter with an alkali solution.

13. The method of claim 12, wherein the organic matter comprises at least one member selected from the group consisting of humic acid, geosmin, and 2-methyl isoborneol.

14. The method of claim 12, wherein said alkali is selected from the group consisting of sodium hydroxide, potassium hydroxide, ammonium hydroxide, and calcium hydroxide, or mixtures thereof.

15. A method of making the colloid of claim 11, comprising mixing a solution and water, to form said colloid;
wherein said solution comprises the sulfone polymer, a solvent, and an acid.

16. The method of claim 15, wherein said polymer is selected from the group consisting of copolymers and homopolymers of polysulfone, polyethersulfone, polyphenylsulfone, and sulfonated polysulfone, or mixtures thereof.

17. The method of claim 15, wherein said solution further comprises a surfactant selected from the group consisting of sodium lauryl sulfate, octyl phenoxy polyethoxy ethanol 4.5, and octyl phenoxy polyethoxy ethanol 10, or mixtures thereof.

18. The method of claim 15, wherein said water further comprises a surfactant.

19. The method of claim 15, wherein said solvent is selected from the group consisting of N-methyl pyrrolidine, N,N-dimethylformamide, dimethyl sulfoxide, acetone, and dioxane, or mixtures thereof.

20. The method of claim 15, further comprising immobilizing the colloid on a substrate.

21. The method of claim 20, wherein said substrate is selected from the group consisting of a membrane and a bead.

22. A method of making a colloid comprising a sulfone polymer, comprising mixing a solution and water, to form said colloid;
wherein said solution comprises the polymer, a solvent, and an acid.

23. The method of claim 22, wherein said polymer is selected from the group consisting of copolymers and homopolymers of polysulfone, polyethersulfone, polyphenylsulfone, and sulfonated polysulfone, or mixtures thereof.

24. The method of claim 22, wherein said solution further comprises a surfactant selected from the group consisting of sodium lauryl sulfate, octyl phenoxy polyethoxy ethanol 4.5, and octyl phenoxy polyethoxy ethanol 10, or mixtures thereof.

25. The method of claim 22, wherein said water further comprises a surfactant.

26. The method of claim 22, wherein said solvent is selected from the group consisting of N-methyl pyrrolidine, N,N-dimethylformamide, dimethyl sulfoxide, acetone, and dioxane, or mixtures thereof.

27. The method of claim 22, further comprising immobilizing the colloid on a substrate.

28. The method of claim 27, wherein said substrate is selected from the group consisting of a membrane and a bead.

* * * * *

UNITED STATES PATENT AND TRADEMARK OFFICE
CERTIFICATE OF CORRECTION

PATENT NO. : 6,669,851 B2  
APPLICATION NO. : 09/995252  
DATED : December 30, 2003  
INVENTOR(S) : Mark M. Clark and Robert Riley Page 1 of 1

It is certified that error appears in the above-identified patent and that said Letters Patent is hereby corrected as shown below:

Column 7, line 43, please delete "10" and insert --11--.
Column 7, line 45, please delete "10" and insert --11--.

Signed and Sealed this

Twelfth Day of September, 2006

JON W. DUDAS  
*Director of the United States Patent and Trademark Office*